(12) United States Patent
You

(10) Patent No.: US 7,254,869 B2
(45) Date of Patent: Aug. 14, 2007

(54) HINGE COUPLING

(76) Inventor: Ching-Chuan You, Rm. 532, 5F. No. 144, Ming Chuan E. Rd., Sec. 3, P.O. Box 1-79, Taipei (TW) 105

( * ) Notice: Subject to any disclaimer, the term of this patent is extended or adjusted under 35 U.S.C. 154(b) by 226 days.

(21) Appl. No.: 11/007,268

(22) Filed: Dec. 9, 2004

(65) Prior Publication Data
US 2006/0123594 A1    Jun. 15, 2006

(51) Int. Cl.
*A45B 25/00*    (2006.01)
(52) U.S. Cl. ............... 16/326; 16/231; 16/258; 16/343; 135/29; 135/31
(58) Field of Classification Search ............ 16/231, 16/235, 270, 257, 258, 260, 261, 343, 347, 16/326; 403/397, 353; 135/21, 20.1, 29, 135/31, 25.32
See application file for complete search history.

(56) References Cited

U.S. PATENT DOCUMENTS

| | | | | |
|---|---|---|---|---|
| 1,807,782 A | * | 6/1931 | Fuchs | 403/353 |
| 2,889,841 A | * | 6/1959 | Kampf | 135/25.31 |
| 5,121,764 A | * | 6/1992 | Wu | 135/31 |
| 5,372,155 A | | 12/1994 | You | |
| 6,102,058 A | * | 8/2000 | You | 135/29 |
| 6,668,845 B2 | * | 12/2003 | Lin et al. | 135/29 |
| 6,758,228 B1 | * | 7/2004 | You | 135/29 |
| 6,789,556 B2 | * | 9/2004 | You | 135/31 |
| 2003/0010367 A1 | * | 1/2003 | Ko | 135/32 |
| 2003/0062073 A1 | * | 4/2003 | Tung | 135/20.1 |

* cited by examiner

*Primary Examiner*—Chuck Y. Mah
*Assistant Examiner*—Michael J. Kyle

(57) ABSTRACT

Disclosed is a hinge coupling comprising a first connective section comprising a hollow first cylinder at one end with a first piece fastened therein, two parallel projections at the other end, each projection having a bent end, a bore in an intermediate portion open to the external, and a bar interconnected the bent ends, the bar being not aligned with rest of the first connective section, and a second connective section comprising an extension at one end, a hollow second cylinder substantially passed from one end to the other end, an intermediate recess, and a groove formed at bottom of the recess. The bar is fastened in the groove by snapping through the recess, a second piece is inserted into the second cylinder by passing over the bar, and the extension is inserted into the bore by counterclockwise pivoting about the bar. Both sections are parallel after folding.

11 Claims, 3 Drawing Sheets

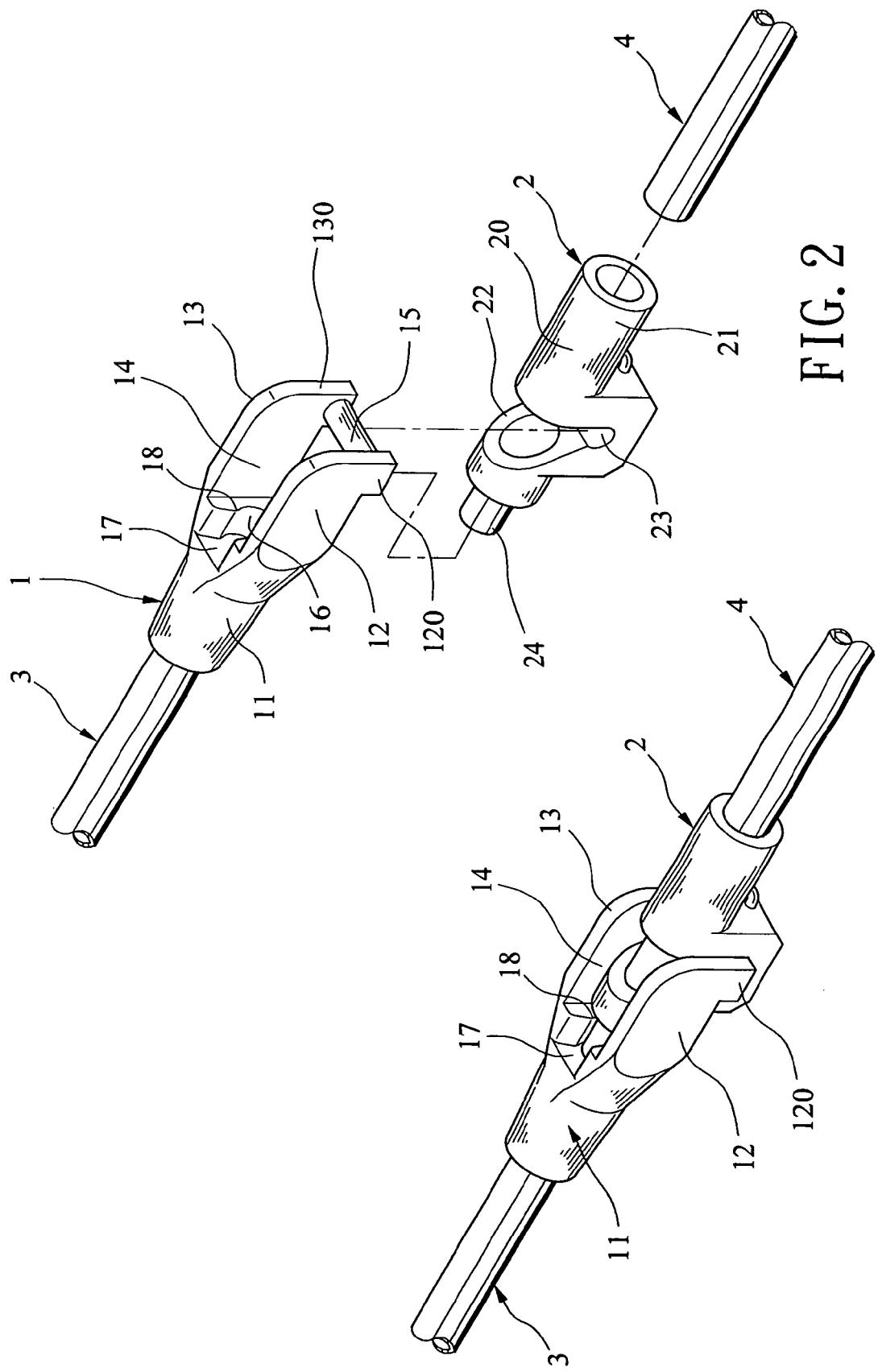

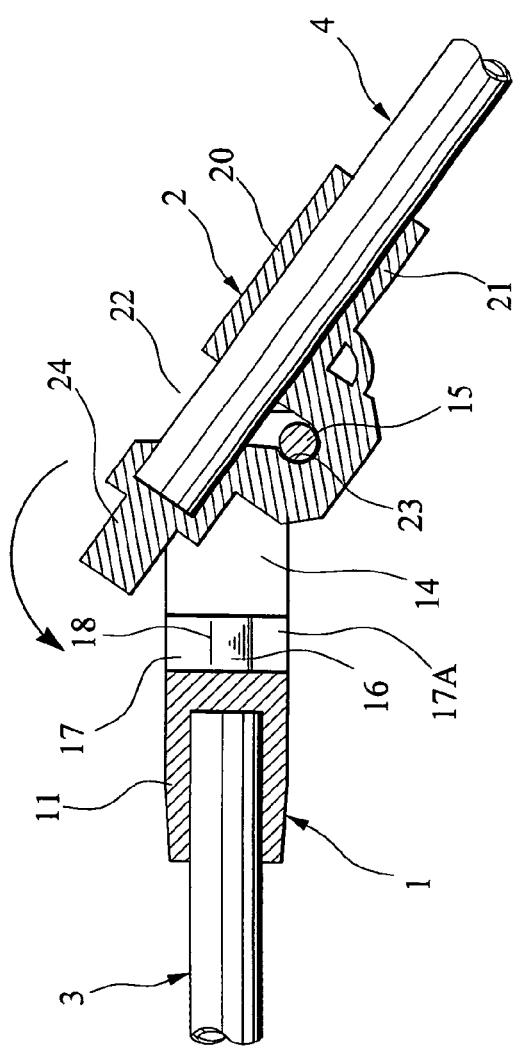
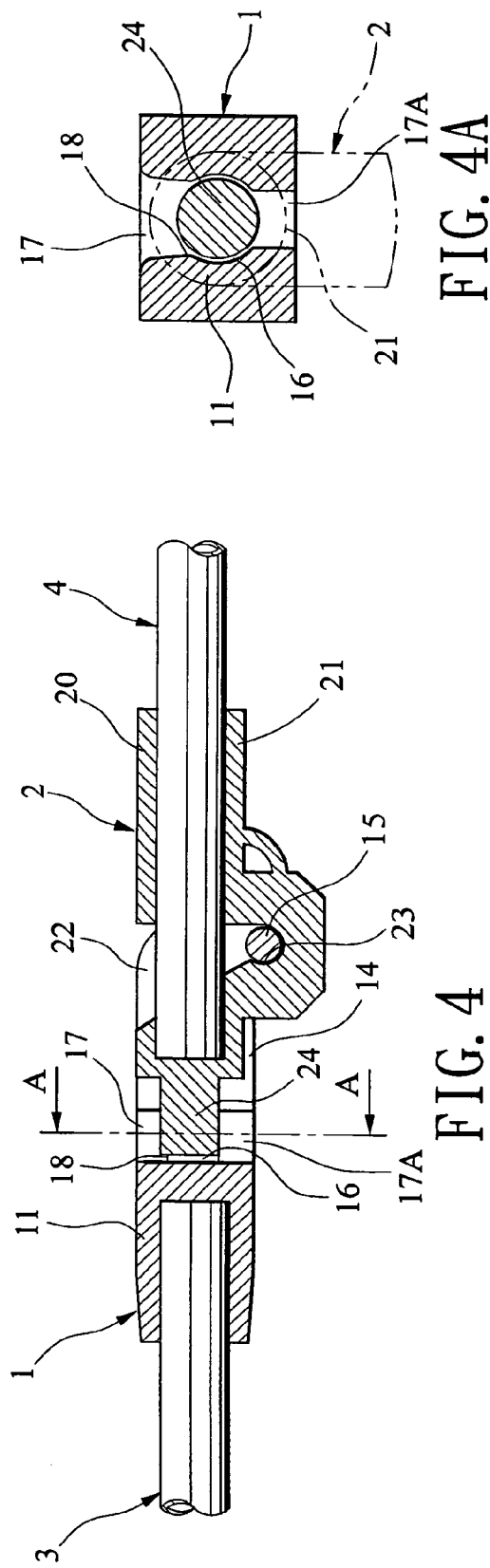
FIG. 3
FIG. 4
FIG. 4A

HINGE COUPLING

BACKGROUND OF THE INVENTION

1. Field of the Invention

The present invention relates to couplings and more particularly to one of at least one improved hinge coupling of, for example, a rib of an umbrella in which one of two sections of the coupling is adapted to fold toward the other to be parallel therewith for saving storage space.

2. Description of Related Art

Foldable products are well known. For example, ribs of an umbrella are foldable toward its shank. Moreover, in another example one of at least one coupling of the rib is formed as a hinge one (i.e., foldable). Typically, the hinge coupling comprises a flat portion at one end of its either section. A hole is formed at either end. A fastener (e.g., rivet) is driven through the holes for hingedly coupling them together. However, the prior art is disadvantageous since (i) the rivet fastening is a time consuming and low yield process and (ii) a parallel folding of the sections is not possible. This in turn compromises the purpose of saving storage space.

U.S. Pat. No. 5,372,155 disclosed a hinge coupling of FRP (fiberglass reinforced plastics) umbrella rib having the advantage of eliminating the above (i) drawback. However, the above (ii) drawback is still not addressed. Thus, the need for improvement still exists.

SUMMARY OF THE INVENTION

It is an object of the present invention to provide a hinge coupling comprising a first connective section comprising a first hollow cylinder at one end with a first piece fastened therein, two parallel projections extending from one end of the first hollow cylinder, each projection having a bent end, a channel defined by the projections, an upper opening and a lower opening at an inner end of the channel, a bore interconnecting the upper opening and the lower opening, and a bar interconnecting the bent ends, and a second connective section comprising a second hollow cylinder, an extension projecting from one end of the second hollow cylinder, an intermediate recess for interrupting the second hollow cylinder, and a groove formed on a bottom of the recess, wherein the bar is fastened in the groove by snapping through the recess, a second piece is inserted into the second hollow cylinder by passing over the bar, and the extension is inserted into the bore by counterclockwise pivoting about the bar and locking in the bore, whereby removing the extension from the bore by pressing the second connective section until the extension releasing from the bore, and clockwise pivoting the second connective section about the bar to a limit will dispose the second connective section to be parallel with the first connective section with a distance therebetween being minimum. By incorporating this hinge coupling in, for example, a rib of an umbrella, the storage space thereof can be saved significantly.

The above and other objects, features and advantages of the present invention will become apparent from the following detailed description taken with the accompanying drawings.

BRIEF DESCRIPTION OF THE DRAWINGS

FIG. 1 is a perspective view of a preferred embodiment of hinge coupling according to the invention;

FIG. 2 is an exploded perspective view of FIG. 1;

FIG. 3 is a sectional view of the assembled coupling where the other section is about to fold toward one section by pivoting;

FIG. 4 is a view similar to FIG. 3 where the sections are coupled together;

FIG. 4A is a sectional view taken along line A-A of FIG. 4; and

DETAILED DESCRIPTION OF THE PREFERRED EMBODIMENTS

Figure 5:
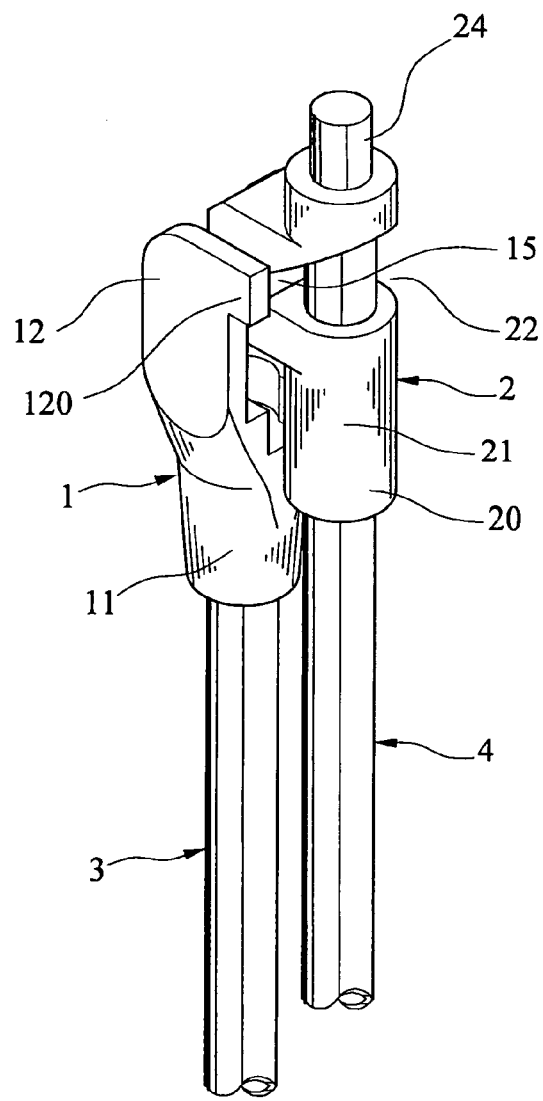
FIGS. 5 and 6 are perspective and sectional views showing two parallel sections being formed by folding respectively.

Referring to FIGS. 1 to 4A, there is shown a hinge coupling in accordance with a preferred embodiment of the invention. The coupling is one of at least one such coupling formed at, for example, a rib of an umbrella taken as an exemplary embodiment of the invention. Note that the hinge coupling is applicable to an umbrella or a tent structure or the like in certain embodiments.

The coupling comprises two sections in which the left one comprises a first piece 3 and a first connective member 1 and the right one comprises a second piece 4 and a second connective member 2. The first connective member 1 comprises a hollow cylinder 11 at one end with the first piece 3 fastened therein, two parallel wall-shaped projections 12 and 13 at the other end, each projection 12 or 13 having a bent end 120 or 130, a channel 14 defined by the projections 12 and 13, a cylindrical bar 15 interconnecting the bent ends 120 and 130 of the projections 12 and 13, the bar 15 being not lain on a longitudinal axis defined by the first piece 3 of the first connective member 1, a cylindrical bore 16 in the intermediate portion of an upper opening 17 and a lower opening 17A, the bore 16 having a blind end proximate a blind end of the cylinder 11, two openings 17 and 17A each in communication with one of two opposite peripheral portions of the bore 16 and the external, as shown in FIG. 4A, each opening 17 having a width smaller than a diameter of the bore 16, and the bore has two arcuate necks 18 each formed at a mouth from a joining portion of the bore 16 and the upper opening 17. The width of the upper opening 17 is larger than that of the lower opening 17A.

The second connective member 2 comprises a cylindrical extension 24 at one end, the extension 24 adapted to insert into the bore 16 by passing the upper opening 17 in an upper portion of the first connective member 1 and fastened by the necks 18, a hollow tube-shaped body 20 including a sleeve 21 at the other end, the sleeve 21 having a blind end proximate the extension 24, the blind end being engaged with the second piece 4 inserted into the sleeve 21, an intermediate recess 22 for dividing the body 20 into two parts, and a groove 23 of half-circular section formed at bottom of the recess 22, the bar 15 being disposed and fastened in the groove 23 by snapping through a joining portion of the recess 22 and the groove 23 prior to inserting the second piece 4 into the sleeve 21 by passing over the bar 15. Also, the insertion of the extension 24 into the bore 16 is carried out by counterclockwise pivoting after inserting the second piece 4 into the sleeve 21 (see FIG. 3). The necks 18 are adapted to fasten the inserted extension 24. Portion of the second connective member 2 between the extension 24 and the groove 23 is substantially disposed in the channel 14. In short, FIGS. 4 and 4A show the hinge coupling in a position ready to use.

Figure 6:
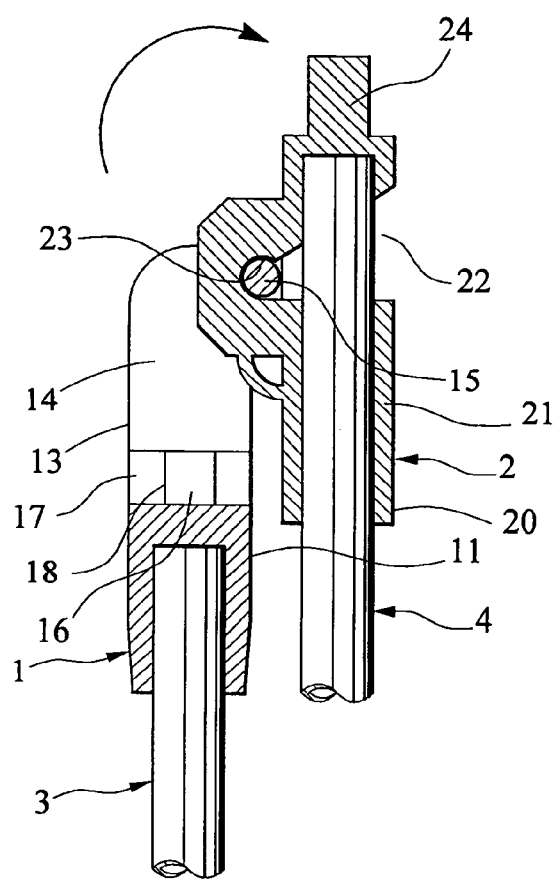

Referring to FIGS. 5 and 6, for folding the hinge coupling prior to storage a user may perform the steps discussed with reference to FIGS. 1 to 4A in the opposite direction. In detail, remove the extension 24 from the bore 16 by pressing the right section of the coupling until the extension 24 passes the neck 18 and the opening 17 in an upper portion of the first connective member 1 (see FIG. 1 or FIG. 4). Next, pivot the right section clockwise about the bar 15 until a limit is reached (see arrow indicated in FIG. 6). At this position, both sections of the coupling are parallel with a distance therebetween being minimum (see FIGS. 5 and 6). In view of the above, storage space is saved significantly. Also, as mentioned above, the folding or unfolding operations of the hinge coupling of the present invention is readily and quickly made without need of any tool.

It is to be noted that the first or second pieces 3 and 4 may be implemented as a portion of a rib of an umbrella or a portion of a rob of a tent when it is applicable.

While the invention herein disclosed has been described by means of specific embodiments, numerous modifications and variations could be made thereto by those skilled in the art without departing from the scope and spirit of the invention set forth in the claims.

What is claimed is:

1. A hinge coupling, comprising:
   a first connective section comprising a first hollow cylinder at one end with a first piece fastened therein, two parallel projections extending from one end of the first hollow cylinder, each projection having a bent end, a channel defined by the projections, an upper opening and a lower opening at an inner end of the channel, a bore interconnecting the upper opening and the lower opening, and a bar interconnecting the bent ends, the bar being not lain on a longitudinal axis defined by the first piece; and
   a second connective section comprising a second hollow cylinder, an extension projecting from one end of the second hollow cylinder, an intermediate recess for interrupting the second hollow cylinder, and a groove formed on a bottom of the recess wherein the bar is fastened in the groove by snapping through the recess, a second piece is inserted into the second hollow cylinder by passing over the bar, and the extension is inserted into the bore by counterclockwise pivoting about the bar and locking in the bore of the first connective section,
   whereby removing the extension from the bore by pressing the second connective section until the extension releasing from the bore, and clockwise pivoting the second connective section about the bar to a limit will dispose the second connective section to be parallel with the first connective section with a distance therebetween being minimum.

2. The hinge coupling of claim 1, wherein the opening has a width smaller than a diameter of the bore.

3. The hinge coupling of claim 1, wherein the bore further comprises an arcuate neck formed at a mouth for fastening the extension inserted thereto.

4. The hinge coupling of claim 1, wherein the first or second piece is implemented as a portion of a rib of an umbrella.

5. The hinge coupling of claim 1, wherein the bore further comprises a blind end proximate the first cylinder.

6. The hinge coupling of claim 1, wherein the second cylinder comprises a blind end proximate the extension.

7. The hinge coupling of claim 1, wherein each of the bore, the first cylinder, and the second cylinder is cylindrical.

8. The hinge coupling of claim 1, wherein the groove is substantially of half-circular section.

9. The hinge coupling of claim 8, wherein the bar is cylindrical.

10. The hinge coupling of claim 1, wherein each of the projection is of wall-shaped.

11. The hinge coupling of claim 1, wherein the first or second piece is implemented as a portion of a rod of a tent.

* * * * *